(12) United States Patent
Fan (10) Patent No.: US 11,282,026 B2
(45) Date of Patent: Mar. 22, 2022

(54) METHOD AND APPARATUS FOR PLANNING ROUTE

(71) Applicant: BEIJING BAIDU NETCOM SCIENCE AND TECHNOLOGY CO., LTD., Beijing (CN)

(72) Inventor: Junxiang Fan, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 452 days.

(21) Appl. No.: 16/269,182

(22) Filed: Feb. 6, 2019

(65) Prior Publication Data

US 2019/0295036 A1 Sep. 26, 2019

(30) Foreign Application Priority Data

Mar. 22, 2018 (CN) .......................... 201810242130.4

(51) Int. Cl.
*G06Q 10/08* (2012.01)
*G06Q 10/04* (2012.01)
*G06Q 30/02* (2012.01)

(52) U.S. Cl.
CPC ..... *G06Q 10/08355* (2013.01); *G06Q 10/047* (2013.01); *G06Q 30/0284* (2013.01)

(58) Field of Classification Search
CPC ............. G06Q 10/08355; G06Q 10/47; G06Q 30/0284
See application file for complete search history.

(56) References Cited

U.S. PATENT DOCUMENTS

2017/0178070 A1* 6/2017 Wang ................. G06Q 10/0832
705/7.24
2017/0228846 A1* 8/2017 Mohr ................. G06Q 10/1097

FOREIGN PATENT DOCUMENTS

| CN | 105354633 | A | | 2/2016 | |
|---|---|---|---|---|---|
| CN | 107194513 | A | | 9/2017 | |
| CN | 107194513 | B | * | 9/2020 | ........... G06Q 10/047 |

OTHER PUBLICATIONS

Jamie Ebery, The capacitated multiple allocation hub location problem: Formulations and algorithms, Feb. 2000, vol. 120, Issue 3, pp. 614-631.*

(Continued)

*Primary Examiner* — Resha Desai
*Assistant Examiner* — John G Webster
(74) *Attorney, Agent, or Firm* — Lathrop GPM LLP (57) ABSTRACT

Embodiments of the present disclosure disclose a method and apparatus for planning a route. A specific embodiment of the method includes: acquiring task information; generating initial route information based on the task information; performing the updating step including: updating the second sequence in the second sequence set based on a preset rule; updating the first sequence in the first sequence set based on the updated second sequence set; and determining a delivery cost of the delivery unit based on the updated first sequence set and the updated second sequence set; and the method further includes: determining, based on the updated first sequence set and the updated second sequence set, a route of the to-be-delivered items delivered from the initial node to the destination node via the intermediate node, in response to the determined delivery cost meeting a preset delivery cost condition.

13 Claims, 5 Drawing Sheets

(56) References Cited

OTHER PUBLICATIONS

Michael Wasner, "An integrated multi-depot hub-location vehicle routing model for network planning of parcel service", Aug. 2004, vol. 90, Issue 3, pp. 403-419.*

* cited by examiner

METHOD AND APPARATUS FOR PLANNING ROUTE

CROSS-REFERENCE TO RELATED APPLICATIONS

This application claims priority to Chinese Patent Application No. 201810242130.4, filed on Mar. 22, 2018, titled "Method and Apparatus for Planning Route," which is hereby incorporated by reference in its entirety.

TECHNICAL FIELD

Embodiments of the present disclosure relate to the field of computer technology, specifically to a method and apparatus for planning a route.

BACKGROUND

Vehicle route planning is a typical combinatorial optimization in the field of urban logistics/supply chain. The core content of the vehicle route planning is: designing the optimal route for one or more motorcades, starting from the warehouse and serving spatially dispersed clients with the minimal cost. In an actual scenario, the vehicle route planning may involve a multi-stage transportation flow, and goods departing from the warehouse may pass through one or more intermediate warehouses before reaching the user location. However, the current existing vehicle route planning method is mainly for single-stage route planning.

SUMMARY

Embodiments of the present disclosure provide a method and apparatus for planning a route.

In a first aspect, the embodiments of the present disclosure provide a method for planning a route. The method includes: acquiring task information, the task information including a location of an initial node where to-be-delivered items are located, a location of a destination node of the to-be-delivered items, and a location of an intermediate node between the initial node and the destination node; generating initial route information based on the task information, the initial route information including a first sequence set and a second sequence set, the first sequence set including at least one first sequence, the first sequence being used to indicate a route of a delivery unit delivering the to-be-delivered items from the initial node to one of the intermediate node, the second sequence set including at least one second sequence, and the second sequence being used to indicate a route of the delivery unit delivering the to-be-delivered items from the one of the intermediate node to the destination node of the to-be-delivered items; performing an updating step including: updating the second sequence in the second sequence set based on a preset rule; updating the first sequence in the first sequence set based on the updated second sequence set; and determining a delivery cost of the delivery unit based on the updated first sequence set and the updated second sequence set; and the method further includes: determining, based on the updated first sequence set and the updated second sequence set, a route of the to-be-delivered item delivered from the initial node to the destination node via the intermediate node, in response to the determined delivery cost meeting a preset delivery cost condition.

In some embodiments, the generating initial route information based on the task information includes: generating the second sequence in the second sequence set based on the task information using a large-scale neighborhood search algorithm; determining, based on the generated second sequence, item information of the to-be-delivered item to be stored by each intermediate node; and generating the first sequence in the first sequence set based on the determined item information using the large-scale neighborhood search algorithm.

In some embodiments, the updating the second sequence in the second sequence set based on a preset rule includes: removing randomly a predetermined number of the destination node included in the second sequence in the second sequence set to obtain a third sequence set, and adding randomly the removed destination node to a third sequence in the third sequence set to generate the updated second sequence set.

In some embodiments, the updating the first sequence in the first sequence set based on the updated second sequence set includes: determining, based on the updated second sequence set, item information of the to-be-delivered item to be stored by the intermediate node; and generating the first sequence in the first sequence set based on the determined item information using a large-scale neighborhood search algorithm.

In some embodiments, after determining a delivery cost of the delivery unit based on the updated first sequence set and the updated second sequence set, the updating step further include: determining the delivery cost of the delivery unit determined based on the updated first sequence set and the updated second sequence set as the target delivery cost, in response to the delivery cost of the delivery unit determined based on the updated first sequence set and the updated second sequence set being less than a target delivery cost.

In some embodiments, after determining a delivery cost of the delivery unit based on the updated first sequence set and the updated second sequence set, the updating step further includes: counting a number of continuous determinations that the delivery cost of the delivery unit determined based on the updated first sequence set and the updated second sequence set is not less than the target delivery cost, in response to the delivery cost of the delivery unit determined based on the updated first sequence set and the updated second sequence set being not less than a target delivery cost; selecting randomly an intermediate node, removing a destination node associated with the selected intermediate node included in the second sequence in the second sequence set to obtain a fourth sequence set, adding the removed destination node randomly to a fourth sequence in the fourth sequence set to generate the updated second sequence, updating the first sequence in the first sequence set based on the updated second sequence set, and determining the delivery cost of the delivery unit based on the updated first sequence set and the updated second sequence set, in response to the counted number being greater than a preset threshold; and determining the delivery cost of the delivery unit determined based on the updated first sequence set and the updated second sequence set as the target delivery cost.

In some embodiments, the determining, based on the updated first sequence set and the updated second sequence set, a route of the to-be-delivered item delivered from the initial node to the destination node via the intermediate node, in response to the determined delivery cost meeting a preset delivery cost condition includes: acquiring a minimum delivery cost in the determined delivery cost in response to meeting a preset update termination condition; and determining the route of the to-be-delivered item delivered from the initial node to the destination node via the intermediate node based on a first sequence set and a second sequence set associated with the acquired delivery cost.

In a second aspect, the embodiments of the present disclosure provide an apparatus for planning a route. The apparatus includes: an acquisition unit, configured to acquire task information, the task information including a location of an initial node where to-be-delivered items are located, a location of a destination node of the to-be-delivered items, and a location of an intermediate node between the initial node and the destination node; a generation unit, configured to generate initial route information based on the task information, the initial route information including a first sequence set and a second sequence set, the first sequence set including at least one first sequence, the first sequence being used to indicate a route of a delivery unit delivering the to-be-delivered items from the initial node to one of the intermediate node, the second sequence set including at least one second sequence, and the second sequence being used to indicate a route of the delivery unit delivering the to-be-delivered items from the one of the intermediate node to the destination node of the to-be-delivered item; an updating unit, configured to perform an updating step including: updating the second sequence in the second sequence set based on a preset rule; updating the first sequence in the first sequence set based on the updated second sequence set; and determining a delivery cost of the delivery unit based on het updated first sequence set and the updated second sequence set; and a determination unit, configured to determine, based on the updated first sequence set and the updated second sequence set, a route of the to-be-delivered item delivered from the initial node to the destination node via the intermediate node, in response to the determined delivery cost meeting a preset delivery cost condition.

In some embodiments, the generation unit includes: a first generation subunit, configured to generate the second sequence in the second sequence set based on the task information using a large-scale neighborhood search algorithm; a first determination subunit, configured to determine, based on the generated second sequence, item information of the to-be-delivered item to be stored by each intermediate node; and a second generation subunit, configured to generate the first sequence in the first sequence set based on the determined item information using the large-scale neighborhood search algorithm.

In some embodiments, the updating unit includes: a first updating subunit, configured to remove randomly a predetermined number of the destination node included in the second sequence in the second sequence set to obtain a third sequence set, and add randomly the removed destination node to a third sequence in the third sequence set to generate the updated second sequence set.

In some embodiments, the updating unit includes: a second determination subunit, configured to determine, based on the updated second sequence set, item information of the to-be-delivered item to be stored by the intermediate node; and a second updating subunit, configured to generate the first sequence in the first sequence set based on the determined item information using a large-scale neighborhood search algorithm.

In some embodiments, the updating unit includes: a third determination subunit, configured to determine the delivery cost of the delivery unit determined based on the updated first sequence set and the updated second sequence set as the target delivery cost, in response to the delivery cost of the delivery unit determined based on the updated first sequence set and the updated second sequence set being less than a target delivery cost.

In some embodiments, the updating unit includes: a counting subunit, configured to count a number of continuous determinations that the delivery cost of the delivery unit determined based on the updated first sequence set and the updated second sequence set is not less than the target delivery cost, in response to the delivery cost of the delivery unit determined based on the updated first sequence set and the updated second sequence set being not less than a target delivery cost; a third updating subunit, configured to select randomly an intermediate node, remove a destination node associated with the selected intermediate node included in the second sequence in the second sequence set to obtain a fourth sequence set, and add the removed destination node randomly to a fourth sequence in the fourth sequence set to generate the updated second sequence, and update the first sequence in the first sequence set based on the updated second sequence set, and determine the delivery cost of the delivery unit based on the updated first sequence set and the updated second sequence set, in response to the counted number being greater than a preset threshold; and a fourth determination subunit, configured to determine the delivery cost of the delivery unit determined based on the updated first sequence set and the updated second sequence set as the target delivery cost.

In some embodiments, the determination unit includes: an acquisition subunit, configured to acquire a minimum delivery cost in the determined delivery cost in response to meeting a preset update termination condition; and a fifth determination subunit, configured to determine the route of the to-be-delivered item delivered from the initial node to the destination node via the intermediate node based on a first sequence set and a second sequence set associated with the acquired delivery cost.

In a third aspect, the embodiments of the present disclosure provide a device, including one or more processors; and a storage apparatus, for storing one or more programs, the one or more programs, when executed by the one or more processors, cause the one or more processors to implement the method according to the first aspect of the present disclosure.

In a fourth aspect, the embodiments of the present disclosure provide a computer readable medium, storing a computer program thereon, the computer program, when executed by a processor, implements the method according to the first aspect of the present disclosure.

By acquiring task information, generating initial route information based on the task information, then performing the following updating step: updating the second sequence in the second sequence set based on a preset rule; updating the first sequence in the first sequence set based on the updated second sequence set; and determining a delivery cost of the delivery unit based on the updated first sequence set and the updated second sequence set, and finally determining, based on the updated first sequence set and the updated second sequence set, a route of the to-be-delivered items delivered from the initial node to the destination node via the intermediate node, in response to the determined delivery cost meeting a preset delivery cost condition, the method and apparatus for planning a route provided by the embodiments of the present disclosure comprehensively consider the delivery cost of the delivery unit for delivering the to-be-delivered items from the initial node to the intermediate node and delivering the to-be-delivered item from one of the intermediate node to the destination node of the to-be-delivered items, thereby improving the efficiency of route planning.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
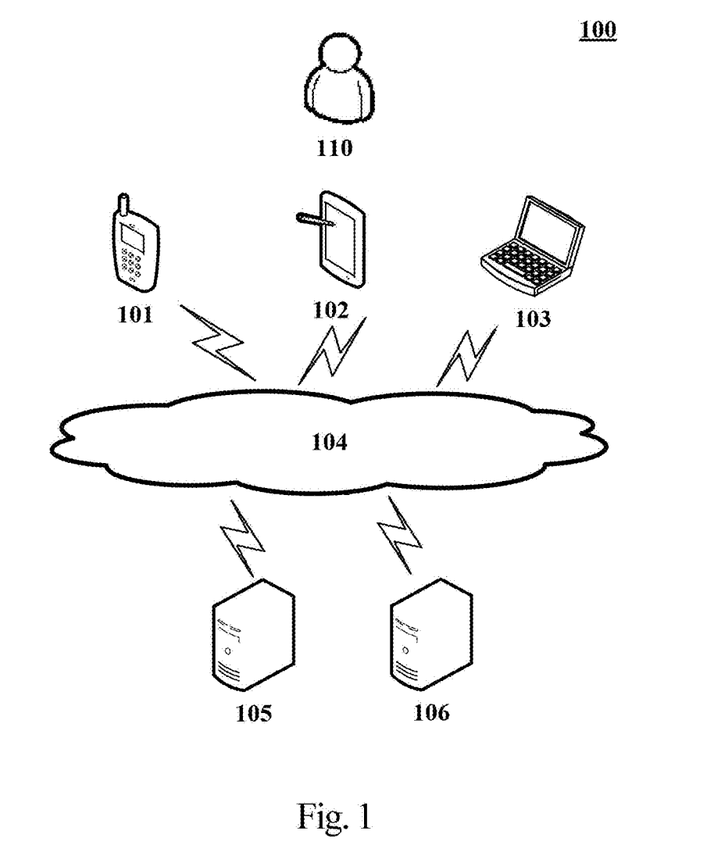
FIG. 1 is an exemplary system architecture diagram to which the present disclosure may be applied.

FIG. 1 shows an exemplary architecture of a system 100 in which a method for planning a route or an apparatus for planning a route according to the embodiments of the present disclosure may be applied.

As shown in FIG. 1, the system architecture 100 may include terminal devices 101, 102 and 103, a network 104 and servers 105 and 106. The network 104 serves as a medium providing a communication link between the terminal devices 101, 102 and 103 and the servers 105 and 106. The network 104 may include various types of connections, such as wired or wireless transmission links, or optical fibers.

The user 110 may use the terminal devices 101, 102 and 103 to interact with the servers 105 and 106 through the network 104, in order to transmit or receive messages, etc. Various communication client applications, such as shopping applications, map applications, payment applications, social applications, webpage browser applications, search engine applications, mobile phone assistant application may be installed on the terminal devices 101, 102 and 103.

The terminal devices 101, 102 and 103 may be hardware or software. When being the hardware, the terminal devices 101, 102 and 103 may be various electronic devices having display screens and supporting webpage browsing, including but not limited to, smart phones, tablet computers, e-book readers, MP3 (Moving Picture Experts Group Audio Layer III) players, MP4 (Moving Picture Experts Group Audio Layer IV) players, laptop computers and desktop computers. When being the hardware, the terminal devices 101, 102 and 103 may be installed the above listed electronic devices. The terminal devices 101, 102 and 103 may be implemented as multiple software or software modules, or implemented as single software or software module, which is not limited herein. The user may upload, through the terminal devices 101, 102 and 103 order information to the server, for the generation of task information by the server, and the order information may include information of purchased items and location information of the user, etc.

The servers 105, 106 may be servers providing various services, such as backend servers that provide support for applications installed on the terminal devices 101, 102, and 103. The servers 105, 106 may acquire task information; generate initial route information based on the task information; perform the following update steps: updating the second sequence in the second sequence set based on a preset rule; updating the first sequence in the first sequence set based on an updated second sequence set; and determining a delivery cost of the delivery unit based on an updated first sequence set and the updated second sequence set; and determine, based on the updated first sequence set and the updated second sequence set, a route of the to-be-delivered item delivered from the initial node to the destination node via the intermediate node, in response to the determined delivery cost meeting a preset delivery cost condition.

It should be noted that the object data updating method according to the embodiments of the present disclosure is generally executed by the server 105. Accordingly, an object data updating apparatus is generally installed on the server 105.

It should be noted that the server may be hardware or software. When the server is hardware, the server may be implemented as a distributed server cluster including multiple servers, or implemented as a single server. When the server is software, the server may be implemented as multiple software or software modules (for example, for providing distrusted service), or may be implemented as a single software or software modules.

It should be appreciated that the numbers of the terminal devices, the networks and the servers in FIG. 1 are merely illustrative. Any number of terminal devices, networks and servers may be provided based on the actual requirements.

Figure 2:
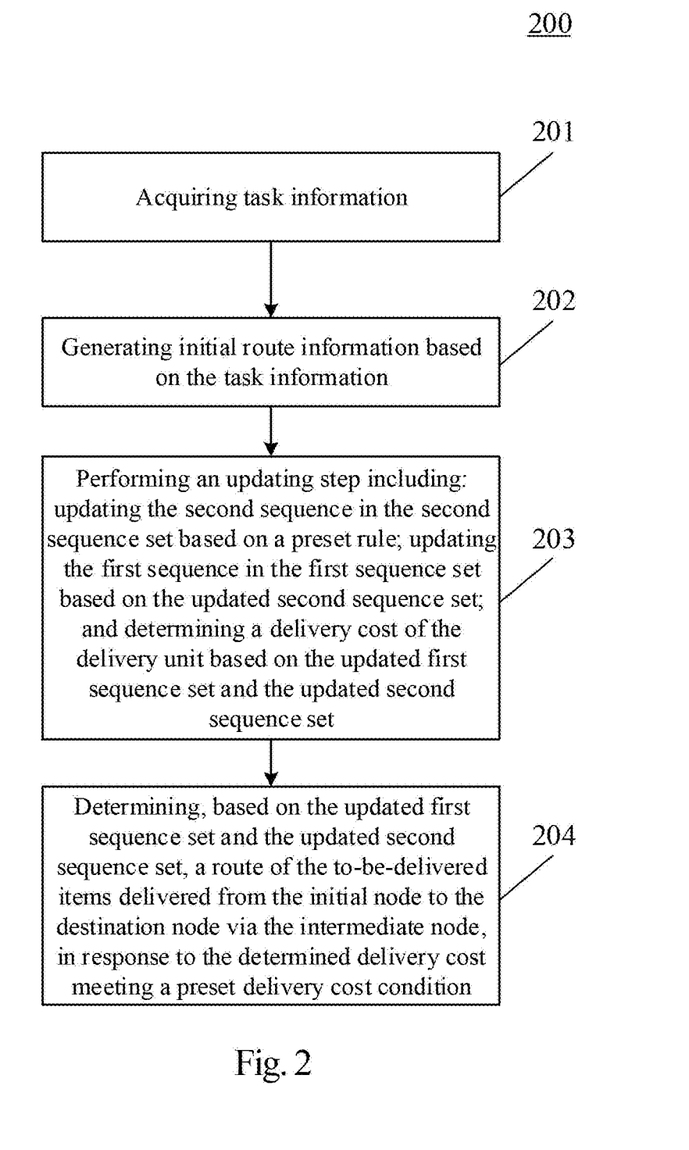
FIG. 2 is a flowchart of an embodiment of a method for planning a route according to the present disclosure.

With reference to FIG. 2, a flow 200 of an embodiment of a method for planning a route according to the present disclosure is illustrated. The method for planning a route includes steps 201 to 204.

Step 201 includes acquiring task information, the task information including a location of an initial node where to-be-delivered items are located, a location of a destination node of the to-be-delivered items, and a location of an intermediate node between the initial node and the destination node.

In the present embodiment, an execution body of the method for planning a route (such as the server shown in FIG. 1) may first acquire the task information. In the task information, the initial node may be a place where the to-be-delivered item is stored, for example, a warehouse where the to-be-delivered item is stored. The intermediate node may be a special location passed by during the delivery of the to-be-delivered item, such as a transit warehouse where the to-be-delivered item is stored. The destination node may be the destination of the to-be-delivered item, such as the address provided by the sending or ordering user of the to-be-delivered item. It should be noted that any number of initial nodes, intermediate nodes, and destination nodes may be provided according to actual needs.

Step 202 includes generating initial route information based on the task information.

In the present embodiment, the execution entity may generate the initial route information based on the task information acquired in step 201. The initial route information includes a first sequence set and a second sequence set, the first sequence set includes at least one first sequence, and the first sequence is used to indicate a route of a delivery unit delivering the to-be-delivered items from the initial node to one of the intermediate node. The delivery unit may be a delivery vehicle, a delivery ship, a delivery drone, a delivery staff, etc., which is not limited in the present application. The second sequence set includes at least one second sequence, and the second sequence is used to indicate a route of the delivery unit delivering the to-be-delivered items from one of the intermediate node to the destination node of the to-be-delivered item. For example, the vehicle 1 loads the to-be-delivered items at the initial node warehouse D1, first unloads a part of the to-be-delivered items at the intermediate node warehouse C1, and then unloads another part of the to-be-delivered items at the intermediate node warehouse C2. Then, in the first sequence set, the first sequence of the vehicle 1 may be (D1-C1-C2). Similarly, if the vehicle 2 loads the to-be-delivered items at the intermediate node warehouse C1 and unloads the to-be-delivered item at the customer E4, then the second sequence of the vehicle 2 in the second sequence set may be (C1-E4).

In some alternative implementations of the present embodiment, the generating initial route information based on the task information includes: generating the second sequence in the second sequence set based on the task information using a large-scale neighborhood search algorithm; determining, based on the generated second sequence, item information of the to-be-delivered item to be stored by the intermediate node; and generating the first sequence in the first sequence set based on the determined item information using the large-scale neighborhood search algorithm. When using the large-scale neighborhood search algorithm, the objective function may be determined according to actual needs, for example, may be that the total delivery distance is the shortest, and/or the total delivery period is the shortest.

Alternatively, the item information may be the quantity, weight, volume, etc. of the item. When there are many to-be-delivered items and the carrying capacity of the delivery unit is limited, the first sequence in the first sequence set in the initial route information is generated based on the determined item information, thereby further improving the feasibility of route planning. In addition, when generating the second sequence in the second sequence set, the item information of the to-be-delivered item together with the task information may be used as a constraint condition to generate a more accurate second sequence.

Step 203 includes performing the following updating steps: updating the second sequence in the second sequence set based on a preset rule; updating the first sequence in the first sequence set based on the updated second sequence set; and determining a delivery cost of the delivery unit based on the updated first sequence set and the updated second sequence set.

In the present embodiment, the execution entity may perform, based on the initial route information generated in step 202, the following updating steps: updating the second sequence in the second sequence set based on the preset rule; updating the first sequence in the first sequence set based on the updated second sequence set; and determining the delivery cost of the delivery unit based on the updated first sequence set and the updated second sequence set. The preset rule may include randomly exchanging the locations of the destination nodes in the second sequence, randomly splitting the second sequence, or randomly arranging the second sequence, and the like. The delivery cost may be the total delivery distance, the total delivery period, or the total delivery cost, and the delivery cost may include the labor cost in the delivery process, the fuel consumption cost of the delivery unit, and the like.

Step 204 includes determining, based on the updated first sequence set and the updated second sequence set, a route of the to-be-delivered item delivered from the initial node to the destination node via the intermediate node, in response to the determined delivery cost meeting a preset delivery cost condition.

In the present embodiment, the execution entity may determine the route of the to-be-delivered item delivered from the initial node to the destination node via the intermediate node based on the updated first sequence set and the updated second sequence set, in response to the delivery cost determined in step 203 meeting the preset delivery cost condition. The preset delivery cost condition may be a condition that the delivery cost is minimum, or the delivery cost is less than a preset threshold.

Figure 3:
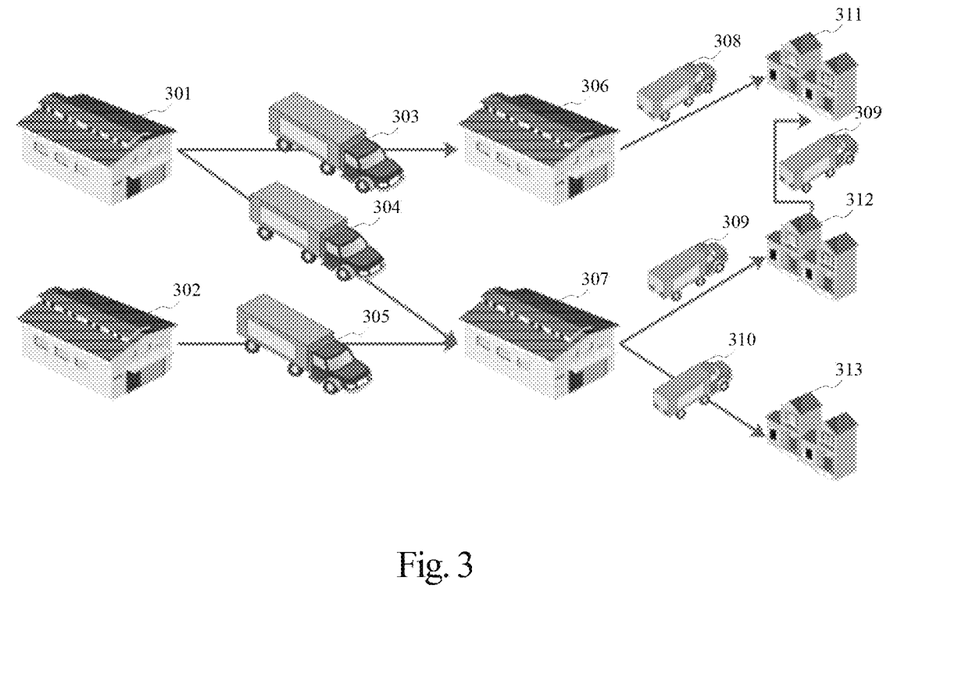
FIG. 3 is a schematic diagram of an application scenario of the method for planning a route according to the present disclosure.

With further reference to FIG. 3, a schematic diagram of an application scenario of the method for planning a route according to the present embodiment is illustrated. In the application scenario of FIG. 3, the execution body of the method for planning a route first acquires task information, including the locations of the initial node 301 and the initial node 302 where the to-be-delivered item are located, the locations of the destination node 311, the destination node 312 and the destination node 313 of the to-be-delivered item, and the locations of the intermediate node 306 and the intermediate node 307, and the initial route information is generated based on the task information. Then, the update steps are performed, and the updated first sequence set includes a first sequence corresponding to the delivery unit 303 (initial node 301-intermediate node 306), a first sequence corresponding to the delivery unit 304 (initial node 301-intermediate node 307), and a first sequence corresponding to the delivery unit 305 (initial node 302-intermediate node 307). The updated second sequence set includes a second sequence corresponding to the delivery unit 308 (intermediate node 306-destination node 311), a second sequence corresponding to the delivery unit 309 (intermediate node 307-destination node 312-destination node 311), and a second sequence corresponding to the delivery unit 310 (intermediate node 307-destination node 313). In response to the preset delivery cost condition being satisfied by the delivery cost determined based on the updated first sequence set and the second sequence set, the routes of to-be-delivered items from the initial nodes to the destination nodes via the intermediate nodes, as shown in FIG. 3, are determined.

Figure 4:
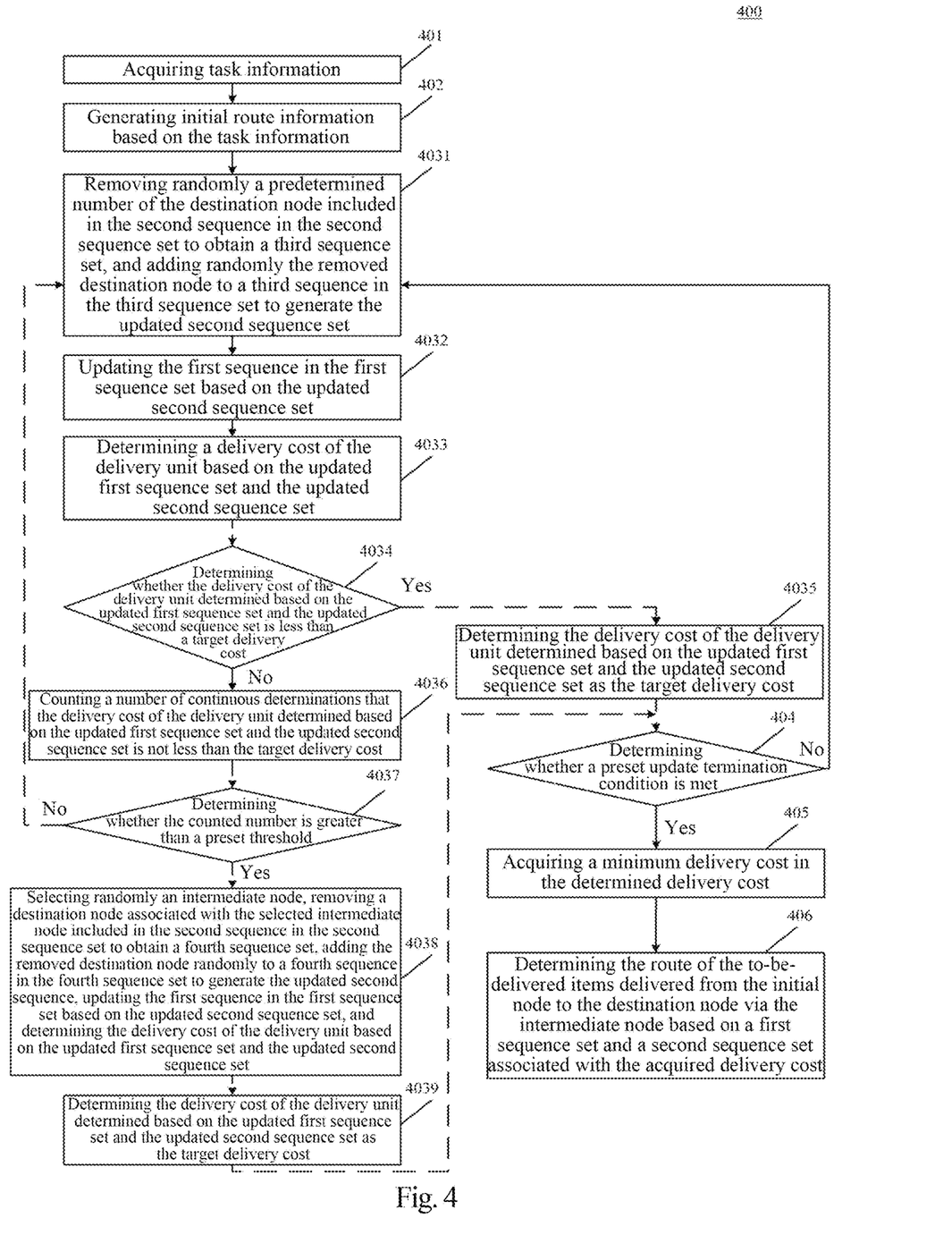
FIG. 4 is a flowchart of another embodiment of the method for planning a route according to the present disclosure.

With further reference to FIG. 4, a flow 400 of another embodiment of the method for planning a route is illustrated. The flow 400 of the method for planning a route includes the following steps.

Step 401 includes acquiring task information.

In the present embodiment, an execution body of the method for planning a route (such as the server shown in FIG. 1) may first acquire task information.

Step 402 includes generating initial route information based on the task information.

In the present embodiment, the execution entity may generate the initial route information based on the task information acquired in step 401.

Step 403 includes performing an updating step.

In the present embodiment, the updating step may include sub-steps 4031-4033.

Step 4031 includes removing randomly a predetermined number of destination node included in the second sequence in the second sequence set to obtain a third sequence set, and adding randomly the removed destination node to a third sequence in the third sequence set to generate the updated second sequence set.

In the present embodiment, the execution entity may randomly remove the predetermined number of destination node included in the second sequence in the second sequence set to obtain the third sequence set, and randomly add the removed destination node to the third sequence in the third sequence set to generate the updated second sequence set. For example, the second sequence of the delivery unit 1 in the second sequence set may be (intermediate node 1-destination node 1-destination node 2-destination node 3), and the second sequence of the delivery unit 2 may be (intermediate node 1-destination node 4). Randomly removing the destination node 1 from the destination node 1, the destination node 2, the destination node 3 and the destination node 4 to obtain the third sequence set, the third sequence of the delivery unit 1 in the third sequence set (intermediate node 1-destination node 2-destination node 3), and the third sequence of the delivery unit 2 (intermediate node 1-destination node 4). Then, the destination node 1 is randomly added to the third sequence in the third sequence set to obtain the updated second sequence. In the updated second sequence set, the updated second sequence of the delivery unit 1 may be, for example, (intermediate node 1-destination node 2-destination node 1-destination node 3), and the updated second sequence of the delivery unit 2 may be (intermediate node 1-destination node 4).

Step 4032 includes updating the first sequence in the first sequence set based on the updated second sequence set.

In the present embodiment, the execution entity may update the first sequence in the first sequence set based on the updated second sequence set. Specifically, based on the updated second sequence set, item information of the to-be-delivered item to be stored by the intermediate node may be determined, and the first sequence in the first sequence set may be updated based on the determined item information using a large-scale neighborhood search algorithm or other algorithms.

Step 4033 includes determining a delivery cost of the delivery unit based on the updated first sequence set and the updated second sequence set.

In the present embodiment, the execution body may determine the delivery cost of the delivery unit based on the updated first sequence set and the updated second sequence set. For example, the delivery cost is the total travelling distance of the delivery unit, and the execution body may determine the total travelling distance of the delivery unit based on the updated first sequence set and the updated second sequence set.

In some alternative implementations of the present embodiment, the updating step may further include substeps 4034-4039.

Step 4034 includes determining whether the delivery cost of the delivery unit determined based on the updated first sequence set and the updated second sequence set is less than a target delivery cost.

The execution entity may determine whether the delivery cost of the delivery unit determined based on the updated first sequence set and the updated second sequence set is less than the target delivery cost, if yes, step 4035 is proceeded, and if no, step 4036 is proceeded. The initial target delivery cost may be determined according to the initial route information. Then, the current target delivery cost may be determined by comparing the initial target delivery cost with the delivery cost of the delivery unit determined by the updated first sequence set for each round of update and the updated second sequence set for each round of update. By maintaining the target delivery cost, it is not necessary to save the delivery cost generated during each one of multiple rounds of updates, thereby further improving the efficiency of route planning.

Step 4035 includes determining the delivery cost of the delivery unit determined based on the updated first sequence set and the updated second sequence set as the target delivery cost.

The execution entity may determine the delivery cost of the delivery unit determined based on the updated first sequence set and the updated second sequence set as the target delivery cost.

Step 4036 includes counting a number of continuous determinations that the delivery cost of the delivery unit determined based on the updated first sequence set and the updated second sequence set is not less than the target delivery cost.

The execution entity may count the number of continuous determinations that the delivery cost of the delivery unit determined based on the updated first sequence set and the updated second sequence set is not less than the target delivery cost.

Step 4037 includes determining whether the counted number is greater than a preset threshold.

The execution entity may determine whether the counted number is greater than the preset threshold. If yes, step 4038 is proceeded. If not, step 4031 is returned. The preset threshold may be determined according to actual needs. By determining whether the counted number is greater than the preset threshold, it may be known whether the multiple update rounds fail to reduce the delivery cost, and further whether the local optimum is achieved.

Step 4038 includes selecting randomly an intermediate node, removing a destination node associated with the selected intermediate node included in the second sequence in the second sequence set to obtain a fourth sequence set, adding the removed destination node randomly to a fourth sequence in the fourth sequence set to generate the updated second sequence, updating the first sequence in the first sequence set based on the updated second sequence set, and determining the delivery cost of the delivery unit based on the updated first sequence set and the updated second sequence set.

The execution entity may randomly select the intermediate node, remove the destination node associated with the selected intermediate node included in the second sequence in the second sequence set to obtain the fourth sequence set, randomly add the removed destination node to the fourth sequence in the fourth sequence set to generate the updated second sequence, update the first sequence in the first sequence set based on the updated second sequence set, and determine the delivery cost of the delivery unit based on the updated first sequence set and the updated second sequence set. Removing the destination node associated with the selected intermediate node included in the second sequence in the second sequence set may include randomly removing about a half of the destination nodes associated with the selected intermediate node included in the second sequence in the second sequence set. By changing the way of updating the second sequence in the second sequence set when the multiple rounds of updates fail to reduce the delivery cost, the possibility of falling into the local optimum is reduced, and the efficiency of route planning is further improved.

Step 4039 includes determining the delivery cost of the delivery unit determined based on the updated first sequence set and the updated second sequence set as the target delivery cost.

The execution entity may determine the delivery cost of the delivery unit determined based on the updated first sequence set and the updated second sequence set as the target delivery cost. The delivery cost obtained by changing the way of updating the second sequence in the second sequence set is determined as the target delivery cost, which avoids the comparison with the delivery cost of the local optimum solution, and further reduces the possibility of falling into the local optimum.

The method of the present embodiment further includes steps 404-406.

Step 404 includes determining whether a preset update termination condition is met.

In the present embodiment, the execution body may determine whether the preset update termination condition is met. If yes, step 4039 is proceeded. If not, step 4031 is returned. The termination condition may include: the update is performed for more than a given time threshold (e.g., 3 minutes); the update is performed for more than a given total number of rounds of update (e.g., performed for 2000 rounds); the update is performed for multiple rounds without optimization (e.g., performed for 50 rounds without reducing the delivery cost).

Step 405 includes acquiring a minimum delivery cost in the determined delivery cost.

In the present embodiment, the execution entity may acquire the minimum delivery cost in the determined delivery cost. The execution entity may compare the delivery cost with the currently recorded and determined minimum delivery cost each time the delivery cost is determined, and update the record of the minimum delivery cost if the delivery cost is less than the currently determined minimum delivery cost. The execution entity may alternatively save each delivery cost, and determine the minimum delivery cost in the saved delivery costs after the termination of the update.

Step 406 includes determining the route of the to-be-delivered items delivered from the initial node to the destination node via the intermediate node based on the first sequence set and the second sequence set associated with the acquired delivery cost.

In the present embodiment, the execution entity may determine the route of the to-be-delivered items delivered from the initial node to the destination node via the intermediate node based on the first sequence set and the second sequence set associated with the acquired delivery cost.

In the present embodiment, the operations of step 401 and step 402 are substantially the same as the operations of step 201 and step 202, and the detailed description thereof is to be omitted.

As can be seen from FIG. 4, compared with the embodiment corresponding to FIG. 2, the flow 400 of the method for planning a route in the present embodiment enriches, by randomly removing and adding the destination node included in the second sequence, the second sequence set obtained by updating, thereby further improving the efficiency of route planning.

Figure 5:
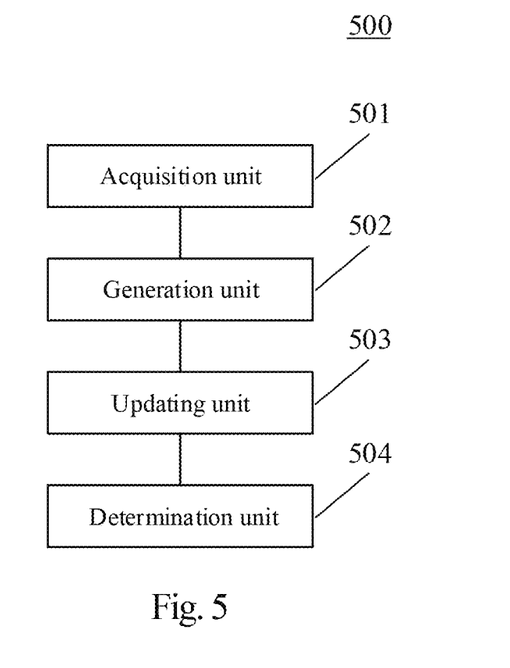
FIG. 5 is a schematic structural diagram of an embodiment of an apparatus for planning a route according to the present disclosure.

With further reference to FIG. 5, as an implementation to the method shown in the above figures, the present disclosure provides an embodiment of an apparatus for planning a route. The apparatus embodiment corresponds to the method embodiment shown in FIG. 2, and the apparatus may specifically be applied to various electronic devices.

As shown in FIG. 5, the apparatus 500 for planning a route of the present embodiment includes: an acquisition unit 501, a generation unit 502, an updating unit 503 and a determination unit 504. Here, the acquisition unit 501 is configured to acquire task information, the task information including a location of an initial node where to-be-delivered items are located, a location of a destination node of the to-be-delivered items, and a location of an intermediate node between the initial node and the destination node. The generation unit 502 is configured to generate initial route information based on the task information, the initial route information including a first sequence set and a second sequence set, the first sequence set including at least one first sequence, the first sequence being used to indicate a route of a delivery unit delivering the to-be-delivered items from the initial node to one of the intermediate node, the second sequence set including at least one second sequence, and the second sequence being used to indicate a route of the delivery unit delivering the to-be-delivered items from one of the intermediate node to the destination node of the to-be-delivered item. The updating unit 503 is configured to perform the following updating steps: updating the second sequence in the second sequence set based on a preset rule; updating the first sequence in the first sequence set based on the updated second sequence set; and determining a delivery cost of the delivery unit based on the updated first sequence set and the updated second sequence set. The determination unit 504 is configured to determine, based on the updated first sequence set and the updated second sequence set, a route of the to-be-delivered items delivered from the initial node to the destination node via the intermediate node, in response to the determined delivery cost meeting a preset delivery cost condition.

In the present embodiment, the specific processing of the acquisition unit 501, the generation unit 502, the updating unit 503 and the determination unit 504 of the apparatus 500 for planning a route may be referred to step 201, step 202, step 203 and step 204 in the embodiment corresponding to FIG. 2.

In some alternative implementations of the present embodiment, the generation unit includes: a first generation subunit, configured to generate the second sequence in the second sequence set based on the task information using a large-scale neighborhood search algorithm; a first determination subunit, configured to determine, based on the generated second sequence, item information of the to-be-delivered items to be stored by each intermediate node; and a second generation subunit, configured to generate the first sequence in the first sequence set based on the determined item information using the large-scale neighborhood search algorithm.

In some alternative implementations of the present embodiment, the updating unit includes: a first updating subunit, configured to remove randomly a predetermined number of destination node included in the second sequence in the second sequence set to obtain a third sequence set, and add randomly the removed destination node to a third sequence in the third sequence set to generate the updated second sequence set.

In some alternative implementations of the present embodiment, the updating unit includes: a second determination subunit, configured to determine, based on the updated second sequence set, item information of the to-be-delivered item to be stored by the intermediate node; and a second updating subunit, configured to generate the first sequence in the first sequence set based on the determined item information using a large-scale neighborhood search algorithm.

In some alternative implementations of the present embodiment, the updating unit includes: a third determination subunit, configured to determine the delivery cost of the delivery unit determined based on the updated first sequence set and the updated second sequence set as the target delivery cost, in response to the delivery cost of the delivery unit determined based on the updated first sequence set and the updated second sequence set being less than the target delivery cost.

In some alternative implementations of the present embodiment, the updating unit includes: a counting subunit, configured to count a number of continuous determinations that the delivery cost of the delivery unit determined based on the updated first sequence set and the updated second sequence set is not less than the target delivery cost, in response to the delivery cost of the delivery unit determined based on the updated first sequence set and the updated second sequence set being not less than the target delivery cost; a third updating subunit, configured to select randomly an intermediate node, remove a destination node associated with the selected intermediate node included in the second sequence in the second sequence set to obtain a fourth sequence set, and add the removed destination node randomly to a fourth sequence in the fourth sequence set to generate the updated second sequence, and update the first sequence in the first sequence set based on the updated second sequence set, and determine the delivery cost of the delivery unit based on the updated first sequence set and the updated second sequence set, in response to the counted number of continuous determinations being greater than a preset threshold; and a fourth determination subunit, configured to determine the delivery cost of the delivery unit determined based on the updated first sequence set and the updated second sequence set as the target delivery cost.

In some alternative implementations of the present embodiment, the determination unit includes: an acquisition subunit, configured to acquire a minimum delivery cost in the determined delivery cost in response to meeting a preset update termination condition; and a fifth determination subunit, configured to determine the route of the to-be-delivered items delivered from the initial node to the destination node via the intermediate node based on a first sequence set and a second sequence set associated with the acquired delivery cost.

By acquiring task information, generating initial route information based on the task information, then performing the following updating steps: updating the second sequence in the second sequence set based on a preset rule; updating the first sequence in the first sequence set based on the updated second sequence set; and determining a delivery cost of the delivery unit based on the updated first sequence set and the updated second sequence set, and finally determining, based on the updated first sequence set and the updated second sequence set, a route of the to-be-delivered items delivered from the initial node to the destination node via the intermediate node, in response to the determined delivery cost meeting a preset delivery cost condition, the apparatus provided by the embodiments of the present disclosure improves the efficiency of route planning.

Figure 6:
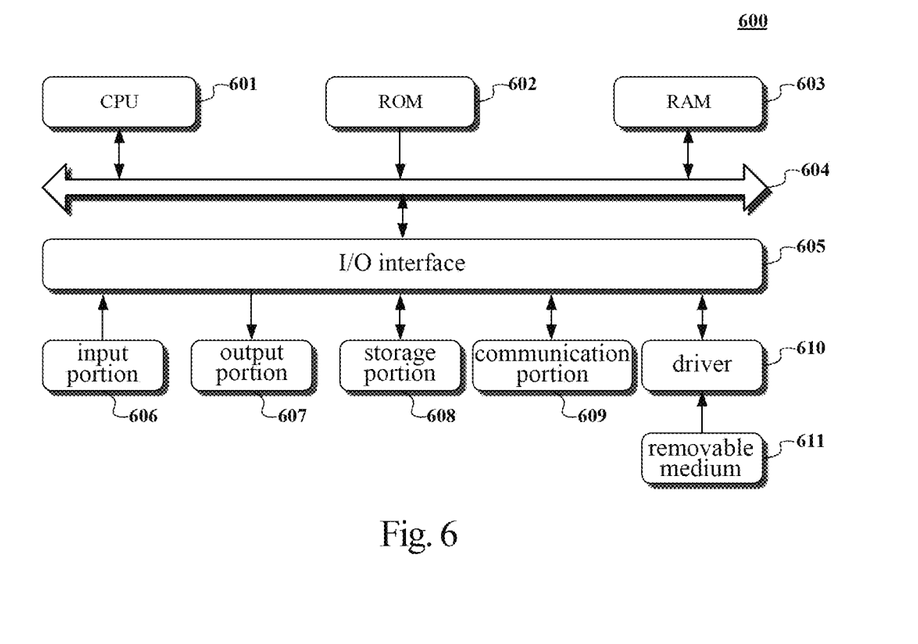
FIG. 6 is a schematic structural diagram of a computer system adapted to implement an execution entity of the embodiments of the present disclosure.

Referring to FIG. 6, a schematic structural diagram of a computer system 600 adapted to implement an execution entity of the embodiments of the present disclosure is shown. The electronic device shown in FIG. 6 is only an example, and should not limit a function and scope of the embodiment of the disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 including a cathode ray tube (CRT), a liquid crystal display device (LCD), a speaker etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including a generation unit an updating unit, and a determination unit, where the names of these units do not in some cases constitute a limitation to such units themselves. For example, the acquisition unit may also be described as "a unit for acquiring task information."

In another aspect, the present disclosure further provides a computer-readable medium. The computer-readable medium may be the computer-readable medium included in the apparatus in the above described embodiments, or a stand-alone computer-readable medium not assembled into the apparatus. The computer-readable medium stores one or more programs. The one or more programs, when executed by a device, cause the device to: acquire task information; generate initial route information based on the task information; perform an updating step including: updating the second sequence in the second sequence set based on a preset rule, updating the first sequence in the first sequence set based on the updated second sequence set, and determining a delivery cost of the delivery unit based on the updated first sequence set and the updated second sequence set; determine, based on the updated first sequence set and the updated second sequence set, a route of the to-be-delivered items delivered from the initial node to the destination node via the intermediate node, in response to the determined delivery cost meeting a preset delivery cost condition.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for planning a route, the method, performed by one or more processors, comprising:
    acquiring task information, the task information comprising a location of an initial node where to-be-delivered items are located, a location of a destination node of the to-be-delivered items, and a location of an intermediate node between the initial node and the destination node;
    generating initial route information based on the task information, the initial route information comprising a first sequence set and a second sequence set, the first sequence set comprising at least one first sequence, the first sequence being used to indicate a route of a delivery unit delivering the to-be-delivered items from the initial node to one of the intermediate node, the second sequence set comprising at least one second sequence, and the second sequence being used to indicate a route of the delivery unit delivering the to-be-delivered items from one of the intermediate node to the destination node of the to-be-delivered items;
    performing an updating step for a plurality of times until a preset update termination condition is met, the updating step comprising:
    i) removing randomly a predetermined number of the destination node comprised in the second sequence in the second sequence set to obtain a third sequence set;
    ii) adding randomly the removed destination node to a third sequence in the third sequence set to generate an updated second sequence set;

iii) updating the first sequence in the first sequence set based on the updated second sequence sets; and determining a delivery cost of the delivery unit based on the updated first sequence set and the updated second sequence set;

iv) determining the delivery cost is not less than a target delivery cost, and counting a number of continuous determinations in performing the updating step for the plurality of times, in response to the delivery cost being not less than the target delivery cost, the determination including determining that the deliver cost is not less than the target delivery cost; and v) selecting randomly an intermediate node associated with a plurality of destination nodes, removing a destination node of the plurality of destination nodes associated with the selected intermediate node comprised in the second sequence in the second sequence set to obtain a fourth sequence set, adding the removed destination node randomly to a fourth sequence in the fourth sequence set to generate the updated second sequence, updating the first sequence in the first sequence set based on the updated second sequence set, and determining the delivery cost of the delivery unit based on the updated first sequence set and the updated second sequence set, in response to the counted number being greater than a preset threshold, wherein the plurality of destination nodes associated with the selected intermediate node are destination nodes of a route of a delivery unit delivering to-be-delivered items from the selected intermediate node;

determining, in response to the preset update termination condition being met and based on the updated first sequence set and the updated second sequence set, a route of the to-be-delivered items delivered from the initial node to the destination node via the intermediate node, in response to the determined delivery cost meeting a preset delivery cost condition; and controlling a vehicle in transportation based on the route of the to-be-delivered items delivered from the initial node to the destination node via the intermediate node.

2. The method according to claim 1, wherein the generating initial route information based on the task information comprises:

generating the second sequence in the second sequence set based on the task information using a large-scale neighborhood search algorithm;

determining, based on the generated second sequence, item information of the to-be-delivered items to be stored by each intermediate node; and generating the first sequence in the first sequence set based on the determined item information using the large-scale neighborhood search algorithm.

3. The method according to claim 1, wherein the updating the first sequence in the first sequence set based on the updated second sequence set comprises:

determining, based on the updated second sequence set, item information of the to-be-delivered item to be stored by the intermediate node; and generating the first sequence in the first sequence set based on the determined item information using a large-scale neighborhood search algorithm.

4. The method according to claim 1, wherein after determining the delivery cost of the delivery unit based on the updated first sequence set and the updated second sequence set, the updating step further comprise:

determining the delivery cost of the delivery unit determined based on the updated first sequence set and the updated second sequence set as the target delivery cost, in response to the delivery cost of the delivery unit determined based on the updated first sequence set and the updated second sequence set being less than the target delivery cost.

5. The method according to claim 1, wherein the updating step further comprise:

determining the delivery cost of the delivery unit determined based on the updated first sequence set and the updated second sequence set as the target delivery cost.

6. The method according to claim 1, wherein the determining, based on the updated first sequence set and the updated second sequence set, a route of the to-be-delivered items delivered from the initial node to the destination node via the intermediate node, in response to the determined delivery cost meeting a preset delivery cost condition comprises:

acquiring a minimum delivery cost in the determined delivery cost in response to meeting a preset update termination condition; and determining the route of the to-be-delivered items delivered from the initial node to the destination node via the intermediate node based on a first sequence set and a second sequence set associated with the acquired delivery cost.

7. An apparatus for planning a route, the apparatus comprising:

at least one processor; and a memory storing instructions, wherein the instructions when executed by the at least one processor, cause the at least one processor to perform operations, the operations comprising:

acquiring task information, the task information comprising a location of an initial node where to-be-delivered items are located, a location of a destination node of the to-be-delivered items, and a location of an intermediate node between the initial node and the destination node;

generating initial route information based on the task information, the initial route information comprising a first sequence set and a second sequence set, the first sequence set comprising at least one first sequence, the first sequence being used to indicate a route of a delivery unit delivering the to-be-delivered items from the initial node to one of the intermediate node, the second sequence set comprising at least one second sequence, and the second sequence being used to indicate a route of the delivery unit delivering the to-be-delivered items from the one of the intermediate node to the destination node of the to-be-delivered items;

performing an updating step for a plurality of times until a preset update termination condition is met, the updating step comprising:

i) removing randomly a predetermined number of the destination node comprised in the second sequence in the second sequence set to obtain a third sequence set;

ii) adding randomly the removed destination node to a third sequence in the third sequence set to generate an updated second sequence set;

iii) updating the first sequence in the first sequence set based on the updated second sequence set, and determining a delivery cost of the delivery unit based on the updated first sequence set and the updated second sequence set;

iv) determining whether the delivery cost is not less than a target delivery cost, and counting a number of continuous determinations in performing the updating step for the plurality of times, in response to the delivery cost being not less than the target delivery cost, the determination including determining that the deliver cost is not less than the target delivery cost; and v) selecting randomly an intermediate node associated with a plurality of destination nodes, removing a destination node of the plurality of destination nodes associated with the selected intermediate node comprised in the second sequence in the second sequence set to obtain a fourth sequence set, adding the removed destination node randomly to a fourth sequence in the fourth sequence set to generate the updated second sequence, updating the first sequence in the first sequence set based on the updated second sequence set, and determining the delivery cost of the delivery unit based on the updated first sequence set and the updated second sequence set, in response to the counted number being greater than a preset threshold, wherein the plurality of destination nodes associated with the selected intermediate node are destination nodes of a route of a delivery unit delivering to-be-delivered items from the selected intermediate node;

determining, based on the updated first sequence set and the updated second sequence set, a route of the to-be-delivered items delivered from the initial node to the destination node via the intermediate node, in response to the determined delivery cost meeting a preset delivery cost condition; and controlling a vehicle in transportation based on the route of the to-be-delivered items delivered from the initial node to the destination node via the intermediate node.

8. The apparatus according to claim 7, wherein the generating initial route information based on the task information comprises:

generating the second sequence in the second sequence set based on the task information using a large-scale neighborhood search algorithm;

determining, based on the generated second sequence, item information of the to-be-delivered items to be stored by each intermediate node; and generating the first sequence in the first sequence set based on the determined item information using the large-scale neighborhood search algorithm.

9. The apparatus according to claim 7, wherein the updating the first sequence in the first sequence set based on the updated second sequence set comprises:

determining, based on the updated second sequence set, item information of the to-be-delivered item to be stored by the intermediate node; and generating the first sequence in the first sequence set based on the determined item information using a large-scale neighborhood search algorithm.

10. The apparatus according to claim 7, wherein after determining the delivery cost of the delivery unit based on the updated first sequence set and the updated second sequence set, the updating step further comprise:

determining the delivery cost of the delivery unit determined based on the updated first sequence set and the updated second sequence set as the target delivery cost, in response to the delivery cost of the delivery unit determined based on the updated first sequence set and the updated second sequence set being less than the target delivery cost.

11. The apparatus according to claim 7, wherein the updating step further comprise:

determining the delivery cost of the delivery unit determined based on the updated first sequence set and the updated second sequence set as the target delivery cost.

12. The apparatus according to claim 7, wherein the determining, based on the updated first sequence set and the updated second sequence set, a route of the to-be-delivered items delivered from the initial node to the destination node via the intermediate node, in response to the determined delivery cost meeting a preset delivery cost condition comprises:

acquiring a minimum delivery cost in the determined delivery cost in response to meeting a preset update termination condition; and determining the route of the to-be-delivered items delivered from the initial node to the destination node via the intermediate node based on a first sequence set and a second sequence set associated with the acquired delivery cost.

13. A non-transitory computer readable medium, storing a computer program thereon, the program, when executed by a processor, causes the processor to perform operations, the operations comprising:

acquiring task information, the task information comprising a location of an initial node where to-be-delivered items are located, a location of a destination node of the to-be-delivered items, and a location of an intermediate node between the initial node and the destination node;

generating initial route information based on the task information, the initial route information comprising a first sequence set and a second sequence set, the first sequence set comprising at least one first sequence, the first sequence being used to indicate a route of a delivery unit delivering the to-be-delivered items from the initial node to one of the intermediate node, the second sequence set comprising at least one second sequence, and the second sequence being used to indicate a route of the delivery unit delivering the to-be-delivered items from one of the intermediate node to the destination node of the to-be-delivered items;

performing an updating step for a plurality of times until a preset update termination condition is met, the updating step comprising:

i) removing randomly a predetermined number of the destination node comprised in the second sequence in the second sequence set to obtain a third sequence set;

ii) adding randomly the removed destination node to a third sequence in the third sequence set to generate an updated second sequence;

iii) updating the first sequence in the first sequence set based on the updated second sequence set, and determining a delivery cost of the delivery unit based on the updated first sequence set and the updated second sequence set;

iv) determining whether the delivery cost is not less than a target delivery cost, and counting a number of continuous determinations in performing the updating step for the plurality of times, in response to the delivery cost being not less than the target delivery cost, the determination including determining that the deliver cost is not less than the target delivery cost; and v) selecting randomly an intermediate node associated with a plurality of destination nodes, removing a destination node of the plurality of destination nodes associated with the selected intermediate node comprised in the second sequence in the second sequence set to obtain a fourth sequence set, adding the removed destination node randomly to a fourth sequence in the fourth sequence set to generate the updated second sequence, updating the first sequence in the first sequence set based on the updated second sequence set, and determining the delivery cost of the delivery unit based on the updated first sequence set and the updated second sequence set, in response to the counted number being greater than a preset threshold, wherein the plurality of destination nodes associated with the selected intermediate node are destination nodes of a route of a delivery unit delivering to-be-delivered items from the selected intermediate node;

determining, based on the updated first sequence set and the updated second sequence set, a route of the to-be-delivered items delivered from the initial node to the destination node via the intermediate node, in response to the determined delivery cost meeting a preset delivery cost condition; and controlling a vehicle in transportation based on the route of the to-be-delivered items delivered from the initial node to the destination node via the intermediate node.

* * * * *